United States Patent
Siebers et al.

(10) Patent No.: US 9,018,113 B2
(45) Date of Patent: Apr. 28, 2015

(54) GLASS CERAMIC AS A COOKTOP FOR INDUCTION HEATING HAVING IMPROVED COLORED DISPLAY CAPABILITY AND HEAT SHIELDING, METHOD FOR PRODUCING SUCH A COOKTOP, AND USE OF SUCH A COOKTOP

(75) Inventors: Friedrich Siebers, Nierstein (DE); Evelin Weiss, Mainz (DE); Falk Gabel, Schlangenbad (DE)

(73) Assignee: Schott AG, Mainz (DE)

( * ) Notice: Subject to any disclaimer, the term of this patent is extended or adjusted under 35 U.S.C. 154(b) by 43 days.

(21) Appl. No.: 13/811,882

(22) PCT Filed: Jul. 15, 2011

(86) PCT No.: PCT/EP2011/003540
§ 371 (c)(1),
(2), (4) Date: Mar. 8, 2013

(87) PCT Pub. No.: WO2012/010278
PCT Pub. Date: Jan. 26, 2012

(65) Prior Publication Data
US 2013/0201678 A1 Aug. 8, 2013

(30) Foreign Application Priority Data
Jul. 23, 2010 (DE) .......................... 10 2010 032 112

(51) Int. Cl.
*C03C 10/14* (2006.01)
*C03C 10/12* (2006.01)
(Continued)

(52) U.S. Cl.
CPC ............ *C03C 10/0054* (2013.01); *C03B 32/02* (2013.01); *C03C 10/0027* (2013.01); *F24C 15/10* (2013.01); *C03B 20/00* (2013.01)

(58) Field of Classification Search
CPC ............ C03C 10/0009; C03C 10/0045; C03C 10/0027
USPC .............................. 501/4, 7; 219/460.1, 445.1
See application file for complete search history.

(56) References Cited

U.S. PATENT DOCUMENTS

2005/0252503 A1 11/2005 Siebers
2011/0226231 A1* 9/2011 Siebers et al. ................. 126/211
(Continued)

FOREIGN PATENT DOCUMENTS

CN 1696072 A 11/2005
DE 19939787 2/2001
(Continued)

OTHER PUBLICATIONS

English Translation of International Preliminary Report on Patentability dated Jan. 31, 2013 corresponding to International Patent Application No. PCT/EP2011/003540.
(Continued)

*Primary Examiner* — Karl Group
(74) *Attorney, Agent, or Firm* — Ohlandt, Greeley, Ruggiero & Perle, LLP (57) ABSTRACT

A glass ceramic as cooktop for induction heating having improved colored display capability and heat shielding is provided. The cooktop includes a transparent, dyed glass ceramic plate having high-quartz mixed crystals as a predominant crystal phase. The glass ceramic contains none of the chemical refining agents arsenic oxide and/or antimony oxide and has a transmittance values greater than 0.4% at at least one wavelength in the blue spectrum between 380 and 500 nm, a transmittance >2% at 630 nm, a transmittance of less than 45% at 1600 nm, and a light transmittance of less than 2.5% in the visible spectrum.

9 Claims, 2 Drawing Sheets

(51) Int. Cl.
*C03C 10/00* (2006.01)
*C03B 32/02* (2006.01)
*F24C 15/10* (2006.01)
*C03B 20/00* (2006.01)

(56) References Cited

U.S. PATENT DOCUMENTS

2012/0067865 A1* 3/2012 Siebers et al. ............ 219/445.1
2013/0140293 A1* 6/2013 Doerk et al. ............ 219/452.12

FOREIGN PATENT DOCUMENTS

| DE | 102008050263 | 4/2010 |
| DE | 202010014361 | 12/2010 |
| EP | 1465460 | 10/2004 |
| EP | 2226303 | 9/2010 |
| JP | 11100229 | 4/1999 |
| JP | 11100230 | 4/1999 |
| JP | 2010013346 | * 1/2010 |
| JP | 2010132546 | * 6/2010 |
| WO | 2010040443 A2 | 4/2010 |
| WO | 2010/137000 | 12/2010 |
| WO | 2011/089220 | 7/2011 |

OTHER PUBLICATIONS

English translation of the International Search Report dated Oct. 12, 2011 corresponding to International Patent Application No. PCT/EP2011/003540.
English translation of the Written Opinion dated Oct. 12, 2011 corresponding to International Patent Application No. PCT/EP2011/003540.
European Office Action dated Apr. 14, 2014 corresponding to European Patent App. No. 11735995.0-1355 with English translation, 12 pp.
Chinese Office Action dated Jul. 10, 2014 corresponding to Chinese Patent Application No. 201180036005.4 with English translation, 17 pp.

* cited by examiner

GLASS CERAMIC AS A COOKTOP FOR INDUCTION HEATING HAVING IMPROVED COLORED DISPLAY CAPABILITY AND HEAT SHIELDING, METHOD FOR PRODUCING SUCH A COOKTOP, AND USE OF SUCH A COOKTOP

The invention relates to a glass ceramic as cooktop for induction heating having improved colored display capability and heat shielding, comprising a transparent, dyed glass ceramic plate having high-quartz mixed crystals as predominant crystal phase, as well as a method for the production thereof, and use thereof. Transparent, dyed glass ceramic cooktops are black when viewed from overhead, thus preventing the technical components of the cooktop from being seen.

Hobs having a glass ceramic plate as cooktop are current state of the art. Such glass ceramic plates are usually available as flat plates or else are deformed three-dimensionally.

Depending on the kind of heating, a distinction is made between various types of glass ceramic cooktops. Radiant heat cooktops are those in which radiant heat elements are heated red-hot by electrical energy owing to their ohmic resistance. The most widespread ribbon heating elements have maximum values of emitted radiation lying in the wavelength range from about 1600 to 3000 nm. Alternatively, the radiant heat elements may also be composed of halogen radiators. The latter heat up faster and radiate at shorter wavelengths with maximum values of the radiation in the range from about 1000 to 1600 nm.

In order to achieve fast heating-up times, the predominant portion of the thermal radiation should be transmitted through the glass ceramic plate to the pot bottom and absorbed there. For this reason, higher transmittance values of greater than 45% in the infrared at 1600 nm are desired. Conventional commercially established glass ceramic cooktops have values that lie at approximately 75%.

In induction cooktops, the energy is directly coupled into the metallic pot bottom via electromagnetic waves produced in coils and absorbed there via eddy currents. This direct heating enables short heating-up times to be achieved. The glass ceramic plate is then heated via the heated pot bottom and further transmits this heat downward to the components under the glass ceramic plate.

In gas-heated glass ceramic cooktops, the glass ceramic plates usually have holes in which the gas burners are integrated. Different thermal loads result depending on the kind of flame and the proximity of the flame to the edge of the holes. In the case of very strong and deeper-lying gas burners, these loads are so high that it is necessary to use a thermally stable glass ceramic instead of a glass. In gas-heated cooktops, the technical components under commercially available glass ceramic plates can also be heated owing to the thermal radiation emitted by the gas flame.

The high infrared transmittance of commercially available glass ceramic plates is therefore rather a drawback, particularly for inductively heated or gas-heated glass ceramic cooktops.

Improved heat shielding is of importance for special operating states during the use of cooktops. In induction cooktops with a booster function, higher power is supplied transiently at the start of the cooking operation in order to shorten cooking times. If high temperatures are thereby attained because they are not detected in due time by electronic control and the power is not reduced, excess heating of the pot bottom occurs. Another operating state with excess heating of the pot bottom can occur if the pot is heated until it is dry and, as a result, heats up owing to the absence of cooked food. In such rare operating states, which nonetheless have to be tolerated by the glass ceramic cooktop, the pot bottom can heat up to about 500° C., resulting in the release of elevated thermal radiation. Such operating states result in short-term elevated thermal radiation that subjects the internal technical components under the glass ceramic plate to loads.

The technical construction of induction cooktops under the glass ceramic plate is composed of coils that produce the inductive field. The wires of these coils have plastic insulation. Other sensitive internal components include, for example, electro-optic sensors that function to measure the temperature of the pot bottom. Furthermore, there are also contact elements for temperature measurement, which are also encapsulated in organic materials. The electrical leads as well as the light-emitting diodes (LEDs) and color displays are also encapsulated with organic materials and are very sensitive. Often, therefore, thermally insulating materials, such as, for example, mica-containing plates and films, are often arranged as shields between the internal technical components and the glass ceramic plate in induction cooktops. The installation and special design of these shields are associated with great expense, because, among other things, recessed regions for display windows or optical sensors are necessary on the one hand and a reliable heat shielding of all critical areas must be ensured on the other hand. Overall, therefore, it is desirable to provide the glass ceramic plate itself with greater heat shielding.

For inductively heated or gas-heated glass ceramic cooktops, the required ability to withstand temperature differentials is lower than for radiant heat cooktops. Whereas, for safe use of radiant heat cooktops, the ability to withstand temperature differentials of greater than 700° C. is required, these temperature differentials lie at values below 600° C. for inductively heated or gas-heated cooktops and lie in part at values of less than 400° C. in systems with complicated electronic control. Because the ability to withstand temperature differentials is partially governed largely by thermal expansion, the glass ceramic can have higher thermal expansion values for inductively heated or gas-heated cooktops. Whereas common specifications for cooktops are approximately $0\pm0.15\times10^{-6}$/K for radiant heat cooktops, this value, measured between room temperature and 700° C., can be up to $0\pm2\times10^{-6}$/K for inductive and gas-heated glass ceramic cooktops. As a result, broader ranges of composition are available for creating glass ceramics. Furthermore, it is advantageous that the thermal expansion can thus be better adapted to other materials, such as, for example, inorganic colorants with which the cooktops are decorated. This means that there is less stress in the decorated areas and, as a result, increased strengths of the glass ceramic plates.

An improved colored display capability represents another key requirement placed on new cooktops. For improvement of operating comfort and for safe operation, modern glass ceramic cooktops are furnished with colored displays, such as 7-segment displays, which are installed under the glass ceramic plate.

Colored displays provide the user with information about the switched state of the individual cooking zones, the control setting, and also whether the cooking zones are still hot after being switched off. Light-emitting diodes are used as conventional colored displays. These colored displays are of great importance especially for induction cooktops. In contrast to radiant heat cooktops in which the heated cooking zone is evident by its glowing red color, the cooking zones in induction cooktops are also black when heated in operation and remain visibly unchanged. Therefore, it is desirable to make the operating state and the residual heat evident by special colors or display functions.

Owing to their intrinsic color and the transmittance curves associated therewith, conventional glass ceramic cooktops have a limited selection of possible colored LED displays. The standard displays used are red or, if necessary, orange. Other displays, such as, in particular, blue or white, have hardly been realized to date. The conventional red light-emitting diodes radiate at wavelengths of around 630 nm and the transmittance of the glass ceramic cooktops is adjusted to about 2 to 12% at this wavelength.

Especially for the use of available blue LEDs, it would be desirable to achieve a transmittance of greater than 0.4% in the range from 380 to 500 nm at at least one wavelength.

The improved colored display capability enables manufacturers of cooking appliances to differentiate their products having a glass ceramic cooktop by way of the design. A design typical of the manufacturer or trade name can result from the nature and shape of the colored displays under the glass ceramic plate. The design via light with the new options that is then possible owing to the transmittance characteristics of the glass ceramic can create unmistakable accents for the market.

The glass ceramic cooktop itself is supposed to appear black when viewed from overhead and have an aesthetic appearance. In order to prevent the technical components under the glass ceramic cooktop from being annoyingly seen and to avoid the dazzling effect of radiating heating elements, particularly bright halogen heating elements, glass ceramic cooktops are limited in their light transmittance. Therefore, the light transmittance may not be greater than about 2.5% for the human eye, because, otherwise, the aesthetic black appearance is lost and the internal technical components under the glass ceramic plate become visible under the usual lighting. In order to satisfy the requirements placed on display capability, the light transmittance is at least 0.5%.

The transmittance values apply regardless of the respective thickness of the glass ceramic plate, because they are crucial for the function of the cooktop.

Glass ceramics having high-quartz mixed crystals as predominant crystal phase are produced from crystallizable lithium aluminum silicate glasses.

The large-scale production of these glass ceramics occurs in several stages. Initially, the crystallizable starting glass is fused from a mixture of shards and powdered blend raw materials at temperatures that are usually between 1500 and 1650° C. Arsenic oxide and/or antimony oxide is typically employed in the melt as refining agent. These refining agents are compatible with the required glass ceramic properties and lead to good bubble qualities in the melt. Even if these substances are permanently incorporated into the glass structure, they are nonetheless detrimental in terms of safety and environmental aspects. Thus, special precautions must be taken during raw material recovery and reprocessing and owing to vapors produced by the melt.

After fusion and refinement, the glass is usually subjected to hot-forming by rollers or, recently, also floating in order to produce plates. Desired for economical production is a low melting temperature and a low processing temperature $V_A$. Furthermore, the glass may not show any devitrification during forming. This means that, during forming, no interfering crystals, which are detrimental to the strength of the starting glasses and the glass ceramics produced from them, may form. Because the forming must take place in the vicinity of the processing temperature $V_A$ (viscosity $10^4$ dPas) of the glass, it must be ensured that the upper devitrification temperature of the melt lies below the processing temperature, so as to prevent the formation of interfering crystals.

In a subsequent thermal process, the starting glass is transformed into the glass ceramic item by controlled crystallization. This ceramization occurs in a two-stage thermal process, in which nuclei are initially produced by nucleation at a temperature of between 680 and 810° C., usually from $ZrO_2$/$TiO_2$ mixed crystals. $SnO_2$ may also take part in nucleation. During the subsequent increase in temperature, the high-quartz mixed crystals grow on these nuclei. High crystal growth rates, such as those desired for economically rapid ceramization, are achieved at temperatures of 820 to 970° C. At this maximum production temperature, the structure of the glass ceramic is homogenized and the optical, physical, and chemical properties are adjusted. If desired, the high-quartz mixed crystals can be subsequently further transformed into keatite mixed crystals. The transformation to keatite mixed crystals occurs during temperature increase in a temperature range of from approximately 970 to 1250° C. Glass ceramics with keatite mixed crystals have high values of thermal expansion. The transformation is also linked to crystal growth to mean crystallite sizes of 100 nm and greater as well as an associated light scattering. Glass ceramics with keatite mixed crystals as main crystal phase are therefore no longer transparent but rather translucent or opaque. For cooktop use, light scattering has a negative effect on the display capability, because the displays under the glass ceramic plate are no longer visible and a disturbing halo is created.

Recently, for the production of environmentally friendly glass ceramic cooktops, the use of $SnO_2$, in particular, has been described as a non-detrimental refining agent. In order to achieve good bubble qualities, halide compounds, besides $SnO_2$, are preferably used as additional refining agent at conventional melt temperatures (maximum approximately 1680° C.). Thus, in the Japanese patent applications JP 11 100 229 A and JP 11 100 230 A, the use of 0.1-2 wt % $SnO_2$ and 0-1 wt % Cl is described. According to these publications, the dyeing is achieved by addition of $V_2O_5$ as sole colorant.

In this way, high transmittance values in the infrared are achieved, because the $V_2O_5$ has the special property of absorbing in the range of visible light and of being translucent in the infrared. This is important for radiant heat cooktops, but has the described drawbacks in terms of heat shielding for inductively heated and gas-heated cooktops.

The use of $SnO_2$ in conjunction with high-temperature refinement above 1700° C. to achieve good bubble qualities is described in DE 199 39 787 C2. However, this publication affords no indication that a good heat shielding is achieved. The key feature of the publication is an infrared transmittance of greater than 65% at 1600 nm, which is important for radiant heat cooktops.

An earlier type of glass ceramic cooktop, known under the name Ceran Color®, manufactured by SCHOTT AG, had good colored display capability in the blue and red. Ceran Color® is dyed by addition of NiO, CoO, $Fe_2O_3$, and MnO and refined by $Sb_2O_3$. This combination of coloring oxides results in a light transmittance of typically 1.2% for cooktops having a conventional thickness of 4 mm. The transmittance in the range from 380 nm to 500 nm is 0.1-2.8% depending on wavelength. At a wavelength of 630 nm, which is conventional for red light-emitting diodes, the transmittance is approximately 6%. The IR transmittance at 1600 nm is less than 20%. The transmittance curve of Ceran Color® is shown in the book "Low Thermal Expansion Glass Ceramics," Editor Hans Bach, Springer-Verlag Berlin Heidelberg 1995, on page 66 (ISBN 3-540-58598-2). The composition is presented in the book "Glass-Ceramic Technology," Wolfram Höland and George Beall, The American Ceramic Society 2002 in Tables 2-7. Use of the refining agent $Sb_2O_3$ is detrimental in terms of an environmentally friendly cooktop. Owing to the low transmittance in the green light range of <0.1% at 580 nm, besides a green display, also a neutral display with white LED is not afforded.

Disclosed in DE 102008050263 A1 is a transparent dyed cooktop having improved colored display capability. On the basis of this publication, a new type of glass ceramic cooktop was recently introduced into the market under the trade name CERAN Hightrans Eco, manufactured by SCHOTT AG.

The cooktop is made of a glass ceramic having high-quartz mixed crystals as predominant crystal phase and contains none of the chemical refining agents arsenic oxide and/or antimony oxide, apart from inevitable traces. The improved colored display capability is characterized by transmittance values of greater than 0.1% in the range of visible light and in the entire wavelength range greater than 450 nm, a light transmittance of 0.8 to 2.5% in the visible, and a transmittance of 45 to 85% in the infrared at 1600 nm. Owing to the high transmittance in the infrared, this glass ceramic is superbly suitable for radiant heat cooktops. However, the high infrared transmittance represents a drawback for use as an inductively heated or gas-heated cooktop. Therefore, for the development of glass ceramic plates that are to be used especially as inductively heated or gas-heated cooktops, it is desirable to lower the infrared transmittance to values below 45% and preferably below 40% in order to improve the heat shielding.

EP 1465460 A2 discloses a glass ceramic cooktop that, measured in the CIE color system, has a Y value (brightness) of 2.5-15 with standard light C at a thickness of 3 mm. The terms "brightness" and light transmittance correspond to the same measured values. The Y value is identical to the value of light transmittance measured according to DIN 5033. Improved displays for blue and green light-emitting diodes were achieved with this light transmittance. The disclosed compositions are refined with $As_2O_3$ and/or $Sb_2O_3$, partially in combination with $SnO_2$. The dyeing is done with $V_2O_5$. In the comparison example, it is demonstrated that, at a light transmittance of 1.9%, the display capability for blue and green light-emitting diodes is inadequate with the material compositions presented. The claimed high values of light transmittance of at least 2.5% and preferably higher are detrimental, however, in terms of covering up the electronic components under the cooktop. Moreover, the aesthetic black appearance of the cooktop when viewed from overhead is impaired.

The problem of the invention is to provide cooktops for induction heating having improved colored display capability and heat shielding as well as method for the production thereof, wherein the cooktops comprise a glass ceramic having high-quartz mixed crystals as predominant crystal phase, contain none of the chemical refining agents arsenic oxide and/or antimony oxide, apart from inevitable traces, and are suited for economical and environmentally friendly production. For economical production, the starting glasses should be readily fusible and refinable, have a high devitrification stability, and be ceramizable in short times. The cooktops according to the invention should satisfy all other requirements placed on the cooktops, such as, for example, chemical resistance, thermal resistance, and high-temperature/time resistance with respect to changes in their properties (such as, for example, thermal expansion, transmittance, creation of stresses).

These problems are solved by a cooktop according to claim 1 and a method according to claim 7.

The cooktops exhibit transmittance values of greater than 0.4% at least one wavelength in the blue spectrum between 380 and 500 nm, a transmittance of >2% at 630 nm, a transmittance of less than 45% at 1600 nm, and a light transmittance of less than 2.5% in the visible.

The transmittance of greater than 0.4% at at least one wavelength in the blue spectrum between 380 and 500 nm makes possible a good display capability with available blue displays. Because these displays, generally composed of light-emitting diodes, radiate at a certain wavelength with a typical width of 15 nm, it suffices if the transmittance of greater than 0.4% is tuned to this wavelength. Such wavelengths for the radiation of standard blue LED displays are, for example, at 430 and 470 nm. The tuning of the transmittance of the glass ceramic to the wavelengths at which the blue LED used radiates has the advantage that the light transmittance of the cooktop is not increased too much. Otherwise, when there is a uniform rise of the transmittance in the wavelength range from 380 to 500 nm, the light transmittance of up to 2.5% according to the invention is quickly surpassed. The combination of several coloring oxides enables the transmittance curve to be increased specially for discrete wavelength ranges. This means that an increase in the display capability takes place in a more significant order of magnitude that can be achieved by a reduction of the material thickness. This is highly relevant with respect to an improved display capability for future, more energy-efficient (lower power) displays as well. It can already be seen today that the wavelength-selective increases in transmittance accomplished in this way offer the potential of improving the display capability even at lower power of LED indicators or displays.

In the range of ultraviolet light of less than 350 nm, the cooktop has the low transmittance value of less than 0.01%, such as is standard for glass ceramic cooktops. The blocking of the UV light is advantageous for protecting the organic components, such as, for example, the adhesives used in the internal technical components under the cooktop, as well as for affording protection during cooking if blue LED displays with ultraviolet radiation portions are used for display.

The light transmittance of less than 2.5% according to the invention ensures that the annoying view of the internal technical components under the glass ceramic cooktop is prevented and the aesthetic black appearance when viewed from overhead is afforded. Owing to the transmittance of >2% at 630 nm, the conventional red light-emitting diodes are easily seen.

Owing to the adjusted infrared transmittance of less than 45%, measured at 1600 nm, the requirements of improved heat shielding are achieved.

As a result, in inductively heated or gas-heated glass ceramic cooktops, the internal electrical and electronic components under the glass ceramic plate are better protected against the thermal radiation of the heated pot bottom. This is of special importance for operating states with excess heating of the pot bottom. As a result, the expense required for using thermally insulating materials to protect the internal components is reduced, since the ceramic plate itself is provided with greater heat shielding.

Preferably, the infrared transmittance is lowered to values of less than 40%, because the heat shielding is further improved.

Because the values of transmittance and light transmittance are decisive for the function of cooktops, they apply regardless of the thickness of the glass ceramic plate, which is usually between 2.5 and 6 mm. Smaller thicknesses are detrimental in terms of strength and greater thicknesses are not economical, because they require more material and lower the rate of ceramization. The thicknesses of cooktops are generally about 4 mm. Because the thicknesses and the concentration of colorant enter equally into the extinction as factors, the skilled practitioner will adjust the required transmittance of the cooktop to the respective thickness via the concentration of colorant without any problem. If the cooktop is produced via forming with rollers, the underside is generally provided with knobs in order to protect it from strength-lowering damage during production. Often, the underside of cooktops is smoothed with transparent organic polymer in the area of colored displays in order to prevent optical distortion by the knobs. In the case of cooktops with a smooth underside and no knobs, colored displays are perceived as being undistorted and brighter.

The cooktops according to the invention have a composition without the refining agents arsenic oxide and/or antimony oxide and, as a result, are technically free of these components, which are detrimental in terms of safety and environmental aspects. These components are usually present as impurity in the raw materials in contents of less than 0.05 wt %.

In order to meet the requirements placed on the ability to withstand temperature differentials for inductively heated and gas-heated cooktops of up to 600° C., the glass ceramic cooktops according to the invention have thermal expansion coefficients of up to $(0\pm2)\times10^{-6}/K$.

The method according to the invention for producing an cooktop for induction heating having improved colored display capability and heat shielding is characterized in that it creates a transparent, dyed glass ceramic containing high-quartz mixed crystals as predominant crystal phase and that, apart from inevitable traces, the chemical refining agents arsenic oxide and/or antimony oxide are dispensed with and the cooktop is adjusted to transmittance values of greater than 0.4% at at least one wavelength in the blue spectrum between 380 and 500 nm, a light transmittance of less than 2.5% in the visible, a transmittance of >2% at 630 nm, and a transmittance of less than 45%, preferably less than 40% at 1600 nm.

Preferably, the transmittance of the cooktop is adjusted to values of greater than 0.1% in the range of visible light in the entire wavelength range of greater than 500 nm, a transmittance of >2 to less than 12% at 630 nm, a transmittance of greater than 30% in the near infrared at 950 nm, and a light transmittance of 0.5-2% in the visible.

At these values, the colored display capability is further improved and the different requirements placed on the transmittance curve are further optimized. Owing to the transmittance of greater than 0.1% in the range of visible light in the entire wavelength range of greater than 500 nm, besides blue displays, differently colored displays, such as green, yellow, or orange, are also readily visible. Displays with white light are less distorted in color by this transmittance curve. Owing to the limitation of the transmittance at 630 nm to values of less than 12%, it is avoided that the red LED displays change, that is, appear too bright. The transmittance of greater than 30% in the near infrared at 950 nm ensures that conventional operating sensors, functioning on an optical basis, can be used. A further improved covering of the internal technical components under the glass ceramic cooktop and an especially aesthetic black appearance when viewed from overhead are achieved if the light transmittance is less than 2%. The display capability further improves if the light transmittance of the cooktop is at least 0.5%.

The cooktop according to the invention preferably contains, as main components of the glass ceramic composition, the following components (in wt % on oxide basis):

| | |
|---|---|
| $Li_2O$ | 1.5-4.2% |
| $\Sigma Na_2O + K_2O$ | 0.2-1.5 |
| MgO | 0-3 |
| $\Sigma CaO + SrO + BaO$ | 0-4 |
| ZnO | 0-3 |
| $B_2O_3$ | 0-2 |
| $Al_2O_3$ | 19-23 |
| $SiO_2$ | 60-69 |
| $TiO_2$ | 1.5-6 |
| $ZrO_2$ | 0.5-2 |
| $P_2O_5$ | 0-3 |
| $SnO_2$ | 0.1-<0.6 |
| $\Sigma TiO_2 + ZrO_2 + SnO_2$ | 3.8-6 | and a combination of at least two coloring oxides selected from the following group with total contents of up to 1 wt %:

| | |
|---|---|
| $V_2O_5$ | 0-0.06 |
| $Fe_2O_3$ | 0.03-0.3 |
| CoO | 0-0.3 |
| $Cr_2O_3$ | 0-0.3 |
| NiO | 0-0.3 |

The oxides $Li_2O$, $Al_2O_3$, and $SiO_2$ in the preferred limits given are necessary components of the high-quartz mixed crystals. A minimum $Li_2O$ content of 1.5 wt % is required for a well-controlled crystallization. Higher contents of greater than 4.2 wt % often lead to undesired devitrification in the production process.

In order to prevent higher viscosities of the starting glass and the undesired devitrification of mullite during forming, the $Al_2O_3$ content is preferably limited to at most 23 wt %. The $SiO_2$ content should be at most 69 wt %, because this component strongly increases the viscosity of the glass. For good fusion of the glasses and for low forming temperatures, higher contents of $Al_2O_3$ and $SiO_2$ are uneconomical. The minimum content of $SiO_2$ should be 60 wt %, because this is advantageous for the required cooktop properties, such as, for example, chemical resistance and thermal resistance.

MgO, ZnO, and $P_2O_5$ can be incorporated into the high-quartz mixed crystals as further components. The ZnO content needs to be limited to values of at most 3 wt % because of the problem posed by the formation of undesired crystal phases, such as zinc spinel (gahnite) during ceramization. The MgO content needs to be limited to at most 3 wt %, because, otherwise, it increases the expansion coefficients of glass ceramic to impermissible values. The addition of $P_2O_5$ is favorable for fusing and forming the starting glass.

The addition of the alkalis $Na_2O$, $K_2O$ and the alkaline earths CaO, SrO, BaO as well as $B_2O_3$ improves the fusibility and devitrification stability during forming of the glass. However, the contents must be limited, because these components are not incorporated into the crystal phases, but rather remain largely in the residual glass phase of the glass ceramic. Contents that are too high are detrimental to the crystallization behavior during transformation of the crystallizable starting glass into the glass ceramic, particularly impairing the attainment of fast ceramization rates. Moreover, higher contents act unfavorably on the time/temperature resistance of the glass ceramic. The sum of the alkalis $Na_2O+K_2O$ should be at least 0.2 wt % and at most 1.5 wt %.

The sum of the alkaline earths CaO+SrO+BaO should be at most 4 wt %. The mentioned alkalis and alkaline earths accumulate also at the surface of the glass ceramic as well as in the residual glass phase between the crystals. During ceramization, an approximately 200 to 1000 nm thick glassy surface layer is formed, which is nearly free of crystals and is enriched in these elements and depleted in lithium. This glassy surface layer acts favorably on the chemical resistance of the glass ceramic.

The minimum quantity of nucleating agent $TiO_2$, $ZrO_2$, and $SnO_2$ is 3.8 wt %. During ceramization, nucleation results in crystalline nuclei in high density, which serve as support for the growth of high-quartz mixed crystals during crystallization. The high nucleus density leads to a higher crystal density with mean crystallite sizes of less than 100 nm, which prevent interfering light scattering in the displays. The contents of nucleating agent are correlated with the rate of nucleation and hence are of importance for shorter ceramization times. Higher contents than a total of 6 wt % worsen the devitrification stability. For improved devitrification stability, the $SnO_2$ content is limited to less than 0.6 wt %. Higher contents lead to crystallization of Sn-containing crystal phases at the contact materials (for example, Pt/Rh) during forming and must absolutely be avoided. The $ZrO_2$ content is limited to 2 wt %, because higher contents worsen the melting behavior of the blend in glass production and can impair the devitrification stability during forming owing to the formation of $ZrO_2$-containing crystals. The minimum content of $ZrO_2$ should be 0.5 wt %, so as to favor a high rate of ceramization.

The $TiO_2$ content lies between 1.5 and 6 wt %. The minimum quantity should not be exceeded, so as to ensure high rates of nucleation in order to achieve higher rates of ceramization. The content should not exceed 6 wt %, because, otherwise, devitrification is worsened.

For adjustment of the transmittance according to the invention with improved colored display capability and heat shielding, a combination of at least two coloring oxides is required. $Fe_2O_3$ contents of 0.03 to 0.3 wt % are combined with at least one other coloring oxide from the group $V_2O_5$, CoO, $Cr_2O_3$, and NiO. Besides the coloring oxide $Fe_2O_3$, the glass ceramic preferably contains NiO and/or CoO in minimum contents of 0.05 wt % in order to adjust the infrared transmittance at 1600 nm to values of less than 45%.

The combination of coloring oxides makes it possible to use lower contents of the expensive colorant $V_2O_5$, which is also classified as a hazardous material. Preferably, the content of the other coloring oxides is at least twice that of the $V_2O_5$.

The coloring oxide contents according to the invention enable all requirements placed on the transmittance curve, such as a light transmittance that meets specification, a lowered infrared transmittance, and a display capability for standard red light-emitting diodes, to be achieved together with the desired improved display capability for blue and differently colored LED displays.

Other coloring components, such as, for example, manganese, copper, selenium, rare earth, and molybdenum compounds can be employed to support coloring and to lower the transmittance in the infrared. Their content is limited to quantities of at most about 1 wt %, because these compounds generally lower transmittance in the blue spectrum. Manganese compounds can be present in higher contents of up to about 2 wt % because of their weaker coloring action.

Addition of 50-400 ppm $Nd_2O_3$ enables the glass ceramic cooktops to be marked. The absorption band of Nd in the near infrared at 806 nm lies in a range of higher transmittance values of the glass ceramic and is thus distinctive in the transmittance spectrum. As a result, the cooktop material can be definitely ascribed to the manufacturer and good recycling by optical shard recognition methods is possible.

The water content of the starting glasses for producing the cooktops according to the invention usually lies between 0.015 and 0.06 mol/L regardless of the choice of blend raw materials and process conditions in the melt. This corresponds to β-OH values of 0.16 to 0.64 $mm^{-1}$ for the crystallizable starting glasses.

For economical production, good fusibility and fast ceramizability of the starting glass is desired. Here, it is necessary to increase to rate of nucleation and ceramization by choice of an appropriate composition. In doing so, it has proven advantageous to increase the contents of the nucleating agents $TiO_2+ZrO_2+SnO_2$ so as to increase the rate of nucleation, whereas the content of $P_2O_5$ has to be chosen to have low values.

In order to improve the fusibility, it has proven advantageous to lower the contents of $SiO_2$, $ZrO_2$, and $Al_2O_3$ and to increase the proportion of components that form the remaining glass phase of the glass ceramic, such as the alkalis $Na_2O$ and $K_2O$ as well as the alkaline earths CaO, SrO, and BaO. The upper limit of the contents of ZnO and MgO are lowered in a preferred way so as to improve the devitrification stability during forming.

Preferably, the $SnO_2$ content is 0.1 to 0.5 wt %. A minimum content of 0.1 wt % is required for refinement of the glass. Furthermore, $SnO_2$ acts as nucleating agent and, if $V_2O_5$ is also used as colorant, it is required as redox partner in order that the vanadium ion can be reduced to the colored lower oxidation state during ceramization. The $SnO_2$ content is at most 0.5 wt % for improved devitrification stability during forming.

Preferably, with respect to good fusibility and fast ceramizability of the starting glass, the cooktop according to the invention has a composition of the glass ceramic substantially comprising the following in wt %:

| | |
|---|---|
| $Li_2O$ | 2-4.2 |
| $Na_2O$ | 0.1-1 |
| $K_2O$ | 0.1-1 |
| Σ $Na_2O + K_2O$ | 0.3-1.3 |
| MgO | 0-2.6 |
| Σ CaO + SrO + BaO | 0.1-4 |
| ZnO | 0-2.5 |
| $B_2O_3$ | 0-1 |
| $Al_2O_3$ | 19-22.5 |
| $SiO_2$ | 60-68 |
| $TiO_2$ | 2.0-6 |
| $ZrO_2$ | 0.8-1.8 |
| $P_2O_5$ | 0-1.5 |
| $SnO_2$ | 0.1-0.5 |
| Σ $TiO_2 + ZrO_2 + SnO_2$ | 4-6 | and a combination of at least two coloring oxides selected from the following group in total contents of 0.1 to 1 wt %:

| | |
|---|---|
| $V_2O_5$ | 0-0.05 |
| $Fe_2O_3$ | 0.03-0.3 |
| CoO | 0-0.3 |
| $Cr_2O_3$ | 0-0.3 |
| NiO | 0-0.3 |

The term "substantially comprising" means that the listed components should be at least 96%, as a rule 98%, of the total composition. A large number of elements, such as, for example, F, Cl, the alkalis Rb, Cs, or elements such as Hf are usual impurities in the large-scale production of the blend raw materials used. Other compounds, such as, for example, the elements Ge, rare earths, Bi, W, Nb, Ta, Y can be added in small proportions.

In order to improve the bubble quality, besides the $SnO_2$ used, other additional refining agents, such as, for example, $CeO_2$, $MnO_2$, sulfate compounds, sulfide compounds, and halide compounds may be employed. Their contents are usually limited to quantities of up to 2 wt %. During the production of cooktops, bubble qualities with bubble numbers of less than 5, preferably less than 3 bubbles/kg glass (in relation to bubble sizes greater than 0.1 mm) are desired as good bubble qualities.

As another important result of addition of $Fe_2O_3$, it was found that it appreciably supports refinement. In combination with $SnO_2$ as refining agent, the $Fe_2O_3$ also releases oxygen and is thereby reduced to $Fe^{2+}$. In order for the addition of $Fe_2O_3$ to act especially advantageously as additional refining agent in combination with $SnO_2$, its content should be at least 0.05 wt % in an especially preferred form.

Both $SnO_2$ and $Fe_2O_3$ are high-temperature refining agents and release the oxygen required for refinement at high melt temperatures above about 1650° C. in adequate amounts. The conversion decisive for refinement increases with the temperature of the melt. Thermal treatment of the melt at a temperature of greater than 1700° C. and even greater than 1750° C. thus affords further improved results in terms of bubble quality. For improved bubble numbers of less than 3 bubbles/kg glass at economically favorable higher tray throughputs, high-temperature refinement at temperatures of the glass melt of greater than 1700° C., preferably greater than 1750° C. is advantageous.

A fast ceramization ability is understood to mean a thermal treatment for crystallization of the glass ceramic with a duration of less than 2 hours, preferably less than 80 minutes.

For ceramization in the method according to the invention, the thermally stress-relieved crystallizable starting glass is heated within 1-30 min to the temperature range of the transformation temperature Tg of the glass of about 680° C. Above this temperature up to about 810° C. is the range with high nucleation rates. The temperature range of nucleation is passed over a period of 8 to 30 minutes. Afterwards, the temperature of the glass containing the crystallization nuclei is increased within 2 to 30 minutes to a temperature of 820 to 970° C., which is characterized by high crystal growth rates of the high-quartz mixed crystal phase. This maximum temperature is held for up to 30 minutes. In this process, the structure of the glass ceramic is homogenized and the optical, physical, and chemical properties are adjusted. The glass ceramic obtained is cooled to 800° C. at cooling rates of approximately 2 to 40° C./min and afterwards rapidly to room temperature.

Addition of reductants in powder and/or liquid form to the starting blend can enhance the coloring effect of the $V_2O_5$ or produce blue-coloring $Ti^{3+}$. Suitable for this are metals, carbon, and/or oxidizable carbon or metal compounds, such as, for example, Al or Si powder, sugar, charcoal, SiC, TiC, MgS, ZnS. Gaseous reductants, such as, for example, forming gas, are also suitable. The mentioned reductants are suitable for lowering the $pO_2$ of the melt. Because vanadium oxide is an expensive raw material, it is economically advantageous to minimize its content.

Preferably, one or more differently colored displays, such as blue, green, yellow, orange, or white, are arranged under the cooktops according to the invention having improved colored display capability in place of or in addition to the usual red displays. The colored displays are composed of light-emitting electronic components, generally made of light-emitting diodes. All shapes of displays, point-like as well as flat, are possible. Black-white and colored displays or screens with markedly improved color fidelity can also be displayed. Besides the indication of operating states, it is thereby possible for the user to interact with the cooktop. For example, recipes can be read, pictures viewed, or the Intranet accessed for communication. The control can occur via touch screens. The underside of the cooktop can have the usual knobs or else have a flat design. The improved display capability becomes especially apparent for cooktops having a smooth underside, because the colored displays are perceived to be undistorted and brighter. The cooktop can include areas with lesser thickness for the displays. Because the transmittance depends exponentially on the layer thickness, the brightness of the display in the case of a screen, for example, is strongly increased. The other areas of the cooktop should be designed to be thicker, however, in order that they have the light transmittance according to the invention.

The cooktop need not only be designed as a flat plate, but can also be deformed three dimensionally in that, for example, beveled, angled, or curved plates can be used. The plates can be right-angled or else exist in other shapes as well as having, besides flat areas, three dimensionally deformed areas, such as, for example, dividers or woks.

The present invention will be illustrated by way of the following examples.

Compositions of crystallizable starting glasses and refinement conditions are listed in Table 1 for some embodiment examples. Here, glasses 1 to 4 are glasses according to the invention and glass 5 is a comparison glass, which leads to a glass ceramic outside of the present invention.

Owing to typical impurities in the blend raw materials used in large-scale production, the compositions do not add up to exactly 100 wt %. Typical impurities, even though not introduced intentionally into the composition, are F, Cl, B, P, Rb, Cs, Hf, which are usually present in less than 0.1 wt %. They are often entrained in raw materials of the chemically related components, for example in Rb and Cs via the Na and K raw materials, respectively, or Sr via the Ba raw material or vice versa.

The starting glasses of Table 1 were fused from raw materials conventionally used in the glass industry at temperatures of approximately 1620° C. for 4 hours. After fusion of the blend in crucibles made of sintered silica glass, the melts were poured into Pt/Rh crucibles containing inner crucibles made of silica glass and homogenized at temperatures of 1550° C. for 30 minutes by stirring. After this homogenization, the glasses were refined at 1640° C. for 2 hours. Subsequently, pieces with a size of 140×80×30 mm³ were cast and allowed to cool in a cooling oven to room temperature, starting at a temperature of 660° C., to prevent stresses. Sample specimens for measurements were prepared from the cast pieces.

Glass No. 4, with the same composition as glass No. 3, was instead refined at 1850° C. for 1 h. The positive influence of high-temperature refinement with respect to bubble quality is visibly revealed for these laboratory melts.

The ceramization of the starting glasses was conducted using the following temperature/time program:
a) rapid heating from room temperature to 680° C. within about 10 min,
b) temperature increase from 680° C. to 730° C. at a heating rate of 10° C./min, further heating at 5.2° C./min to 810° C.,
c) temperature increase from 810° C. to a maximum temperature $T_{max}$ of 920° C. at a heating rate of 6° C./min, holding time $t_{max}$ of 6 min at the maximum temperature, d) cooling from the maximum temperature to 800° C. at 5.5° C./min, then rapid fast cooling to room temperature.

Shown in Table 2 are the properties in the ceramized state, such as the thermal expansion between 20 and 700° C. and the transmittance values for selected wavelengths. The values were determined on polished plates with the given thicknesses, which are typical for cooktops. The optical measurements were carried out with standard light C, 2 degrees.

Figure 1:
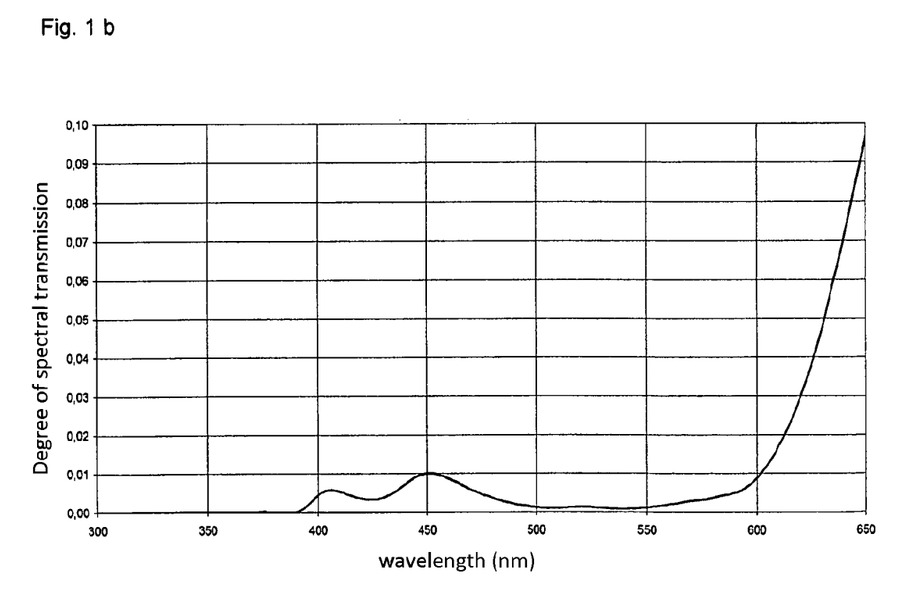
FIGS. 1a, 1b, and 2 illustrate transmission spectrum of the glass ceramic according to the invention.
Figure 1A:
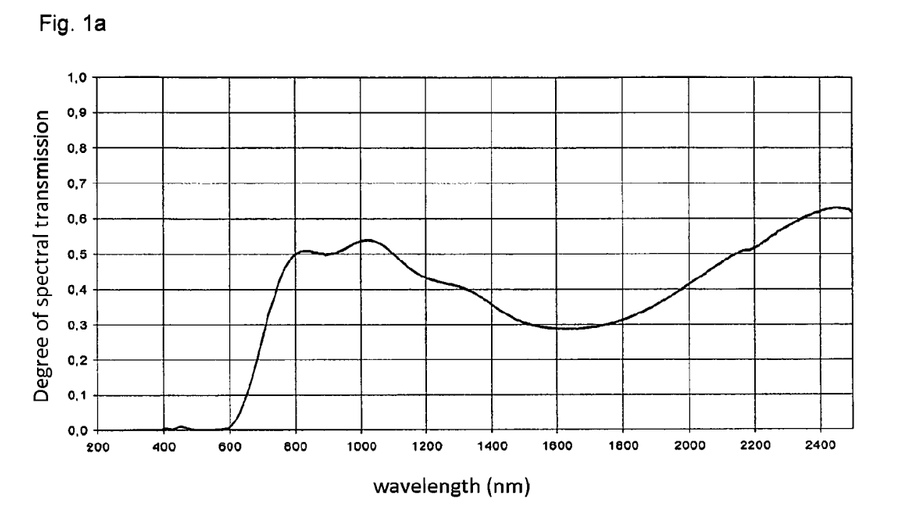

FIG. 1a and 1b: Transmission spectrum of the glass ceramic according to the invention, Example No. 4 from Table 2, various axis resolutions.

FIG. 1a: Ordinate: Degree of spectral transmittance=1.0 (transmittance=100%),

FIG. 1b: Ordinate: Degree of spectral transmittance=0.1 (transmittance=10%).

Figure 2:
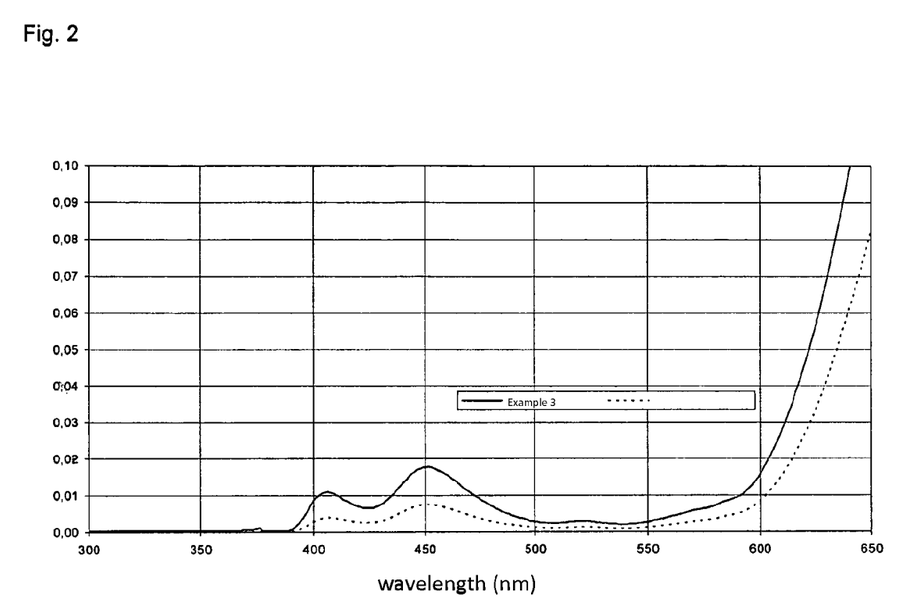

Glass No. 3 fulfills the desired requirements placed on the display capability and heat shielding for cooktops of thickness 3.5 (Example 3), and 4 mm (Example 4) and is characterized by an especially advantageous combination of coloring oxides. As a result of high-temperature refinement of glass No. 4, with the same composition as glass No. 3, the coloring effect is enhanced especially for vanadium oxide in the region of visible light. This is shown by direct comparison of Example 5 with Example 3, because both of them have a thickness of 3.5 mm. The curves are shown in FIG. 2.

In the comparison glass ceramic of Example 6, the requirements placed on good display capability and improved heat shielding cannot be achieved for cooktops of the usual thicknesses.

Owing to their content of high-quartz mixed crystals as predominant crystal phase, the examples have the desired low values of thermal expansion, measured in a temperature range of between 20 and 700° C. For the invention, the characteristic values for transmittance at various wavelengths, as well as for light transmittance, which is equivalent to "brightness" Y, are listed in the table.

TABLE 1

Compositions and refinement temperatures of crystallizable starting glasses and comparison glass 5 according to the invention.

| Compo- sitions in wt % on oxide basis | | Glass No. | | | | |
|---|---|---|---|---|---|---|
| | | 1 | 2 | 3 | 4 Same as glass No. 3 | 5 |
| $Li_2O$ | | 3.82 | 3.87 | 3.86 | | 2.98 |
| $Na_2O$ | | 0.59 | 0.59 | 0.57 | | 0.46 |
| $K_2O$ | | 0.26 | 0.26 | 0.26 | | 0.20 |
| MgO | | 0.31 | 0.31 | 0.32 | | 1.47 |
| CaO | | 0.41 | 0.42 | 0.40 | | 0.31 |
| SrO | | — | — | — | | 0.52 |
| BaO | | 2.31 | 2.32 | 2.29 | | 1.86 |
| ZnO | | 1.44 | 1.49 | 1.44 | | 1.55 |
| $Al_2O_3$ | | 20.4 | 20.6 | 20.6 | | 20.0 |
| $SiO_2$ | | 64.8 | 65.1 | 65.0 | | 65.3 |
| $TiO_2$ | | 3.09 | 2.54 | 3.11 | | 4.44 |
| $ZrO_2$ | | 1.34 | 1.35 | 1.37 | | 0.28 |
| $SnO_2$ | | 0.25 | 0.25 | 0.25 | | 0.22 |
| $P_2O_5$ | | — | — | 0.10 | | — |
| $MnO_2$ | | 0.20 | 0.20 | 0.024 | | — |
| CoO | | 0.21 | 0.21 | 0.089 | | 0.047 |
| $Fe_2O_3$ | | 0.18 | 0.18 | 0.077 | | 0.095 |
| NiO | | 0.27 | 0.27 | 0.13 | | 0.15 |
| $V_2O_5$ | | 0.015 | — | 0.018 | | 0.012 |
| Refining temperature, | °C. | 1640 | 1640 | 1640 | 1850 | 1640 |
| Refining time | h | 2 | 2 | 2 | 1 | 2 |

TABLE 2

Properties of glass ceramics according to the invention, Examples 1 to 5 and comparison glass ceramic, Example 6

| | | Example No. | | | | | |
|---|---|---|---|---|---|---|---|
| | | 1 | 2 | 3 | 4 | 5 | 6 |
| Glass No. | | 1 | 2 | 3 | 3 | 4 | 5 |
| Thermal expansion | | | | | | | |
| $\alpha_{20/700}$ | $10^{-6}/K$ | 0.43 | 0.31 | 0.15 | 0.15 | 0.15 | 1.18 |
| Transmission standardized light C., 2° | | | | | | | |
| Thickness | mm | 2.5 | 3.0 | 3.5 | 4.0 | 3.5 | 2.5 |
| 400 nm | % | 0.3 | 0.2 | 0.9 | 0.4 | 0.3 | <0.01 |
| 450 nm | % | 1.3 | 3.8 | 1.8 | 1.0 | 0.8 | 0.2 |
| 470 nm | % | 0.9 | 2.1 | 1.1 | 0.6 | 0.5 | 0.4 |
| 500 nm | % | 0.3 | 0.2 | 0.3 | 0.1 | 0.1 | 0.5 |
| 600 nm | % | 0.6 | 0.8 | 1.6 | 0.9 | 0.9 | 1.4 |
| 630 nm | % | 4.5 | 7.8 | 6.9 | 4.8 | 4.2 | 3.3 |
| 700 nm | % | 31.7 | 49.9 | 30.4 | 26.0 | 22.5 | 11.2 |
| 950 nm | % | 45.5 | 40.3 | 55.3 | 51.5 | 53.6 | 50.8 |
| 1600 nm | % | 20.7 | 14.1 | 33.4 | 28.9 | 33.0 | 52.9 |
| Light transmittance γ | % | 0.9 | 1.3 | 1.3 | 0.8 | 0.8 | 1.1 |

The invention claimed is:

1. A glass ceramic suitable for use as a cooktop for induction heating having improved colored display capability and heat shielding, comprising:
 a transparent, dyed glass ceramic plate having high-quartz mixed crystals as a predominant crystal phase, wherein the glass ceramic plate contains none of the chemical refining agents arsenic oxide or antimony oxide, apart from inevitable traces;
 transmittance values of the glass ceramic plate of:
  >0.4% at at least one wavelength in a blue spectrum between 380 and 500 nm,
  >2% at 630 nm,
  <45% at 1600 nm; and
 a light transmittance in a visible spectrum of less than 2.5%.

2. The glass ceramic according to claim 1, wherein the transmittance values of the glass ceramic plate comprises <40% at 1600 nm.

3. The glass ceramic according to claim 1, wherein the transmittance values of the glass ceramic plate of greater than 0.1% in the range of visible light in the entire wavelength range of the visible range greater than 500 nm, a transmittance of <12% at 630 nm, a transmittance of greater than 30% in the near infrared at 950 nm, and a transmittance of 0.5-2% in the visible spectrum.

4. The glass ceramic according to claim 1, further comprising a composition in wt % on an oxide basis comprising:

| $Li_2O$ | 1.5-4.2; |
|---|---|
| $\Sigma Na_2O + K_2O$ | 0.2-1.5; |
| MgO | 0-3; |
| $\Sigma CaO + SrO + BaO$ | 0-4; |
| ZnO | 0-3; |
| $B_2O_3$ | 0-2; |
| $Al_2O_3$ | 19-23; |
| $SiO_2$ | 60-69; |
| $TiO_2$ | 1.5-6; |
| $ZrO_2$ | 0.5-2; |
| $P_2O_5$ | 0-3; |
| $SnO_2$ | 0.1-<0.6; | and
$\Sigma TiO_2+ZrO_2+SnO_2$ 3.8-6, and a combination of at least two coloring oxides selected from the group consisting of with total contents of up to 1 wt %:

| | |
|---|---|
| $V_2O_5$ | ≥0-0.06; |
| $Fe_2O_3$ | 0.03-0.3; |
| CoO | ≥0-0.3; |
| $Cr_2O_3$ | ≥0-0.3; and |
| NiO | ≥0-0.3. |

5. The glass ceramic according to claim 1, further comprising good fusibility and fast ceramization ability of a starting glass and a composition comprising in wt % on an oxide basis:

| | |
|---|---|
| $Li_2O$ | 2-4.2; |
| $Na_2O$ | 0.1-1; |
| $K_2O$ | 0.1-1; |
| $\Sigma$ $Na_2O$ + $K_2O$ | 0.3-1.3; |
| MgO | 0-2.6; |
| $\Sigma$ CaO + SrO + BaO | 0.1-4; |
| ZnO | 0-2.5; |
| $B_2O_3$ | 0-1; |
| $Al_2O_3$ | 19-22.5; |
| $SiO_2$ | 60-68; |
| $TiO_2$ | 2.0-6; |
| $ZrO_2$ | 0.8-1.8; |
| $P_2O_5$ | 0-1.5; |
| $SnO_2$ | 0.1-0.5; | and
$\Sigma TiO_2+ZrO_2+SnO_2$ 4-6, and a combination of at least two coloring oxides selected from the group consisting of with total contents of 0.1 to 1 wt %:

| | |
|---|---|
| $V_2O_5$ | ≥0-0.05; |
| $Fe_2O_3$ | ≥0.03-0.3; |
| CoO | ≥0-0.3; |
| $Cr_2O_3$ | ≥0-0.3; and |
| NiO | ≥0-0.3. |

6. The glass ceramic according to claim 1, further comprising a glass melt temperature of greater than 1700° C. and a bubble number of less than 3 bubbles/kg.

7. The glass ceramic according to claim 6, wherein the glass melt temperature is greater than 1750° C.

8. The glass ceramic according to claim 1, further comprising one or more colored displays having a color selected from the group consisting of blue, green, yellow, orange, and white.

9. The glass ceramic according to claim 1, further comprising $Fe_2O_3$ of 0.03 to 0.3 wt % combined with NiO and/or CoO in minimum contents of 0.05 wt % in order to adjust the infrared transmittance at 1600 nm to less than 45%.

\* \* \* \* \*